Figures 3, 4, 5:
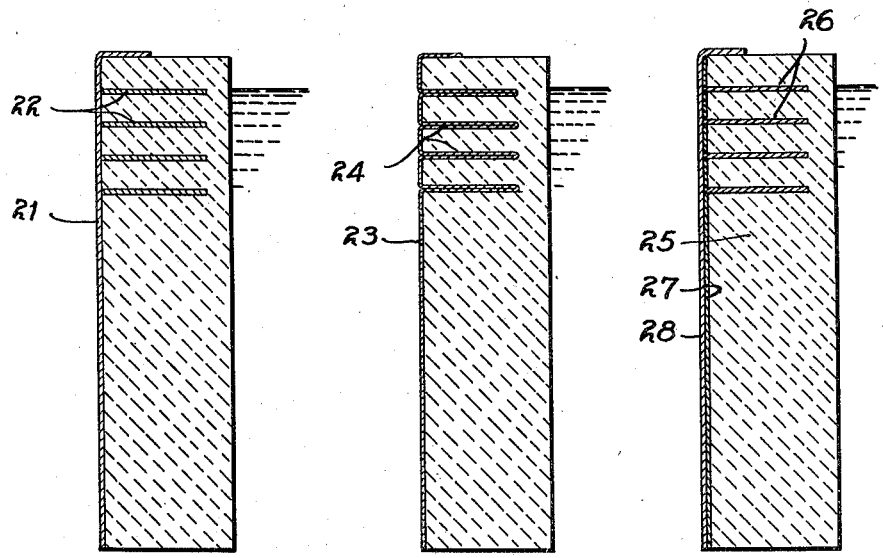

Sept. 7, 1937.   A. H. STEWART   2,092,537
FURNACE WALL
Filed Oct. 14, 1935   3 Sheets-Sheet 1
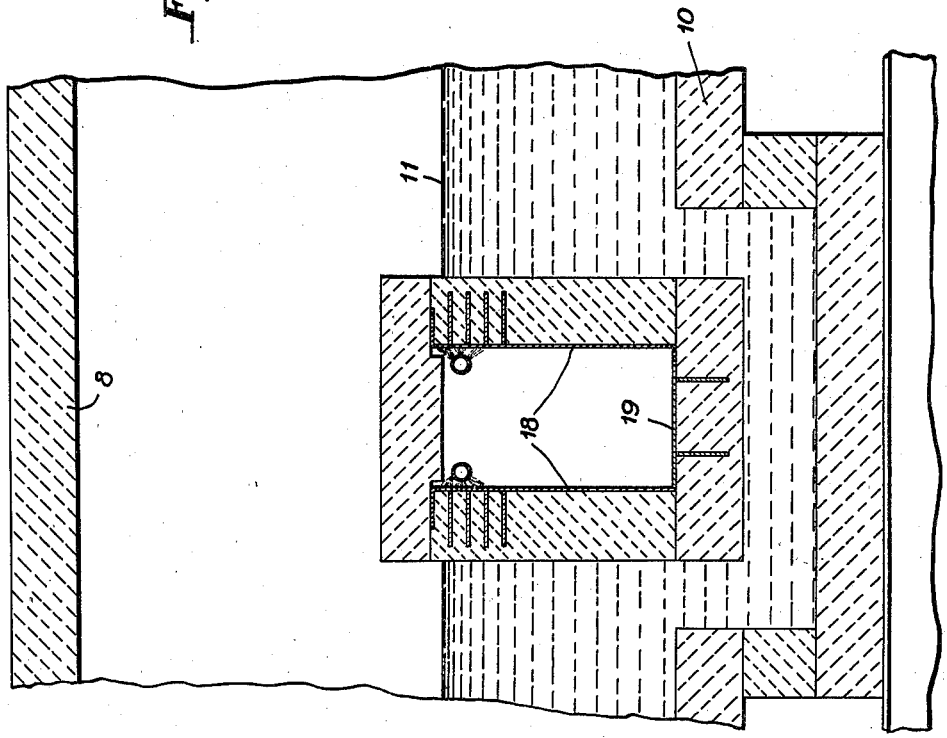
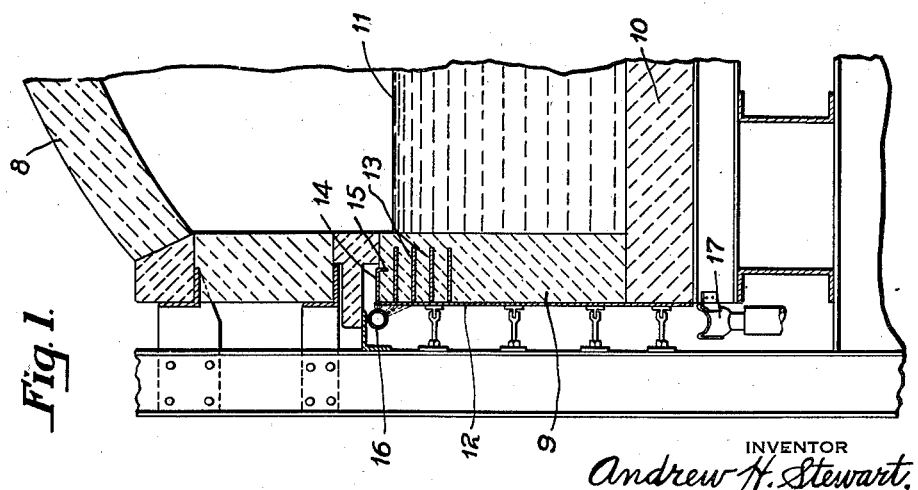
INVENTOR
Andrew H. Stewart,
By Archworth Martin,
Attorney.

Sept. 7, 1937. A. H. STEWART 2,092,537
FURNACE WALL
Filed Oct. 14, 1935 3 Sheets-Sheet 2

INVENTOR
Andrew H. Stewart
By Archworth Martin,
Attorney.

Sept. 7, 1937.  A. H. STEWART  2,092,537
FURNACE WALL
Filed Oct. 14, 1935  3 Sheets-Sheet 3
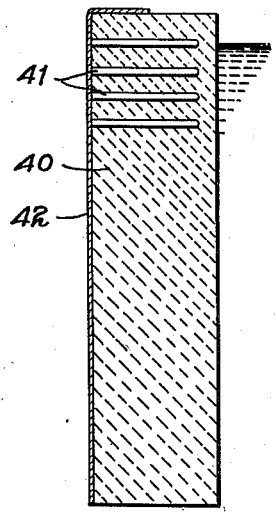
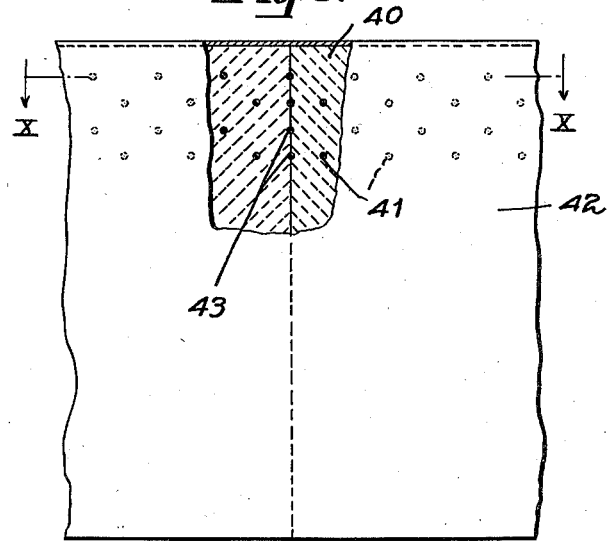
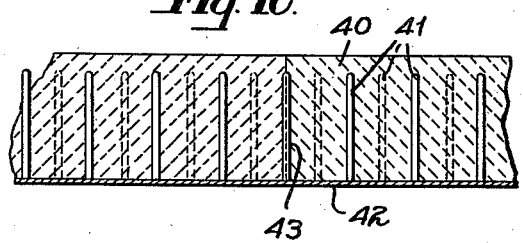
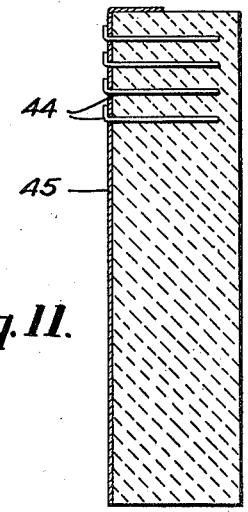
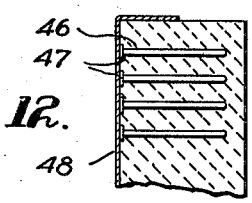
INVENTOR
Andrew H. Stewart,
By Archworth Martin,
Attorney.

Patented Sept. 7, 1937

2,092,537

UNITED STATES PATENT OFFICE 2,092,537

FURNACE WALL

Andrew H. Stewart, Shields, Pa.

Application October 14, 1935, Serial No. 44,874

13 Claims. (Cl. 263—44)

My invention is particularly useful in connection with tank blocks such as are commonly employed in forming melting tanks for glass or other metals, but various features thereof are also useful in other relations, as will be hereinafter explained.

In glass-melting furnaces or the like, the refractory blocks which form the walls of the furnace are subjected to such high temperatures that their walls, and particularly the wall surfaces directly in contact with the molten glass or metal, erode and spall away rapidly, requiring frequent renewals and rebuilding of the tanks.

One manner of prolonging the life of such blocks has consisted in blowing air directly against the outer sides of the blocks, at about the pool level, and in some cases providing recesses in the blocks into which air is blown from points exteriorly of the furnace to cool the blocks, but the use of air is rather expensive, and it is not nearly as efficient as water. Water pipes have also been employed to cool the blocks, but the cooling area is necessarily confined to small zones. Metal water jackets have been employed against the outer sides of the blocks, the water circulated through such jackets or chambers, but it is not possible to have sufficiently intimate contact between the jacket and the wall to secure adequate heat transfer.

My invention has for one of its objects the provision of means for effectively conducting heat from points within a furnace block or the like to the exposed face thereof, to thereby render the block more resistant to erosion and spalling under the action of molten metal, because of the reduced temperature of the block at the point of contact with the molten glass.

Another object of my invention is to apply a metal facing to a tank block or the like in such manner that there is close-fitting contact of the metal with the refractory body, and in such manner that the metal facing can be sprayed with water without danger of the water seeping into or being absorbed by the refractory block.

Another object of my invention is to provide thin metallic inserts in a tank block wall, extending from a point adjacent to the inner face thereof to the outer side of the wall, in sufficient quantity to provide effective cooling of the wall, and arranged in such manner that exposure of the inner ends of the inserts to the molten metal will not result in rupture or wall failure and loss of molten metal.

Figure 6:
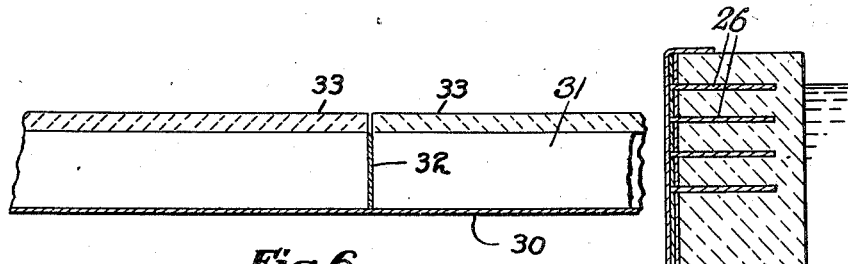
Figures 5A, 7:
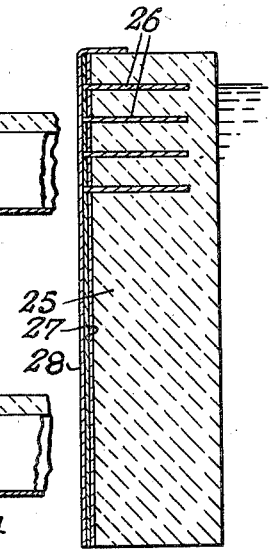

Some of the ways in which my invention may be practiced are shown in the accompanying drawings wherein Figure 1 is a vertical cross-sectional view through a portion of a metal furnace or tank; Fig. 2 is a longitudinal sectional view through another portion of the tank; Figs. 3, 4 and 5 are vertical sectional views through a tank block, showing various forms of metal facing plates or sheets provided with fins; Fig. 6 is a plan view showing a metal facing sheet having fins disposed at both horizontal and vertical planes, Fig. 7 is a modification showing an expansion joint provided in the metal facing at the line of juncture of two refractory blocks; Fig. 8 is a cross-sectional view of a tank block showing a modified form of metal inserts therein for effecting cooling of the block; Fig. 9 is a face view thereof, partly in section; Fig. 10 is a view taken on the line X—X of Fig. 9; Fig. 11 is a view similar to Fig. 8, but showing a modification thereof, and Fig. 12 shows a further modification.

Referring first to Figs. 1 and 2, I show a portion of a melting furnace having a roof 8, side wall blocks 9, and bottom blocks 10, these blocks being usually of clay or other suitable refractory material and commonly designated "flux blocks". The molten glass or other material is indicated by the numeral 11.

The outer or exposed surfaces of the blocks 9 are provided with metal facing sheets or plates 12 that have fins 13 extending into the bodies of the blocks. A fin or flange 14 is provided at the upper edge of the plate 12 and has a lip 15 which extends vertically into the block 9. This additional metal insert at 15 is located at the normal glass level at which point the erosive action of the molten glass is greatest. The fins may also be employed near the bottom of the block to check erosion at that point.

The fins 13 and 14 may be cast integrally with the plate 12 if the plate is made in the form of a casting or can be welded to the plate 12, particularly if the plate and fins are formed of sheet metal. The fins will preferably be approximately co-extensive in length with the plate 12.

In order to form slots in the block 9 for receiving the fins, the mold in which the block is formed may contain core bars of perhaps slightly greater thickness than the fins 13, which core bars are separated from the block when the block is removed from the mold for firing. Instead of forming the slots by the use of core bars, saw cuts could be made in the block for the reception of the fins 13.

For some purposes, the plates 12 with their fins, could be placed in a mold and the block cast over them, but in many instances such procedure would not be suitable because of difficulties encountered in firing the blocks by reason of the differences in expansion and contraction as between the metal and the clay.

The plates 12 and their fins can be formed of aluminum, alloy steel, or other suitable metal which will not appreciably discolor glass, which metal has greater heat conductivity than the refractory blocks and preferably has a high melting point. In order to effect intimate contact between the fins and the clay block 9, the fins could be made of a malleable metal and have press fit with the slots. Also, the fins could be made slightly thinner than the width of the slots and a light fire clay mortar introduced into the slots when the plates are being applied to the block.

Although as previously pointed out, the top portion or fin 14 of the facing sheet 12 functions as a heat transfer medium for speeding up the transfer of heat from the refractory material to the atmosphere and to a cooling fluid, it also seals the exposed top edge portion of the block 9 and positively holds the facing sheet 12 and its associated fins 13 in position. That is, even although the facing sheet and the web portions are preferably of a material having a higher melting point than the refractory blocks, the intense heat and the temperature difference between the inner and outer portions of these metal members tend to cause them to sag and bend out of shape and position. Thus, the horizontally extending portion 14 being positioned above the normal level of the molten glass 11 in the fore-hearth is not subjected to as great and intense temperatures or temperature differences and serves as an anchor for positively holding the portions 12 and 13 in position; sagging is thus prevented and the facing will be retained in efficient thermal relationship with the refractory block even after a long period of use. As seen particularly in Figure 1, the facing sheet 12 is adapted to extend vertically substantially the full depth of the molten material in the container and the fin members 13 and 14 are adapted to extend horizontally into the refractory brick or block 9; the fin members 13 act to conduct a major portion of the heat since they are located below the level of the molten material 11.

It will be seen that the fins 13, 14 and 15 will conduct heat to the plate 12, where it will be radiated, or the plate 12 cooled by an air or a water spray. The temperature of the block 9 in the zone of the metallic inserts 13 will thus be kept at a low point relative to the temperature of the molten glass, thus retarding the disintegration of the block and greatly increasing the life of the furnace walls. A water spray is provided at 16, the water flowing down the exposed surface of the plate 12, and the surplus water flowing away through a trough 17.

Even when the inner ends of the fins are exposed to the molten metal, there is not rapid erosion thereof because they are presented endwise to the metal and are maintained at a low temperature relative to the temperature of the molten metal. Also, each fin is isolated from adjacent fins by portions of the block, and molten metal penetrating any crevices between the fin and the block will merely freeze therein. Consequently, exposure of the metallic inserts or fins to the molten metal will not result in wall failure, as in the case of water jackets becoming so exposed and burning away, thereby requiring renewal of the wall.

In Fig. 2, I show metal plates 18 and 19 incorporated in the bridge wall of a glass furnace, these plates being provided with fins corresponding to the fins 13 and 14, and thus serving to prolong the life of the bridge wall.

Fig. 3 shows a metal face plate 21 having fins 22 cast integrally therewith, and which plate is suitable for use in the structures of Figs. 1 and 2.

Fig. 4 shows a sheet metal face plate 23 having its fins 24 formed by folding the plate at various points.

Referring now to Fig. 5, a block 25 has slots for the reception of metal strips 26. A facing layer 27 is formed on the block by spraying atomized molten metal thereon through the use of metal-spraying devices well-known in the art. The coating 27 could also be applied by dipping the face of the block in molten metal.

The facing 27 can be of a solderable metal such as antimony, tin, zinc, lead, or various soft white metal alloys. A basic layer such as copper could first be sprayed on the block and the adhering metal applied over the basic coat.

A metal facing sheet 28 is then applied to the coating 27 and caused to snugly adhere thereto by subjecting it to soldering temperatures, as by the use of heated smoothing irons, or blow torches.

It will thus be seen that I preferably spray a basic layer of suitable metal such as copper, aluminum, etc., directly upon the surface of the block in order to provide a suitable adherent metal coating. I then preferably provide a facing layer 27 which may be applied, for example, by spraying the basic sprayed layer or by dipping the block in molten metal. Other methods of application will be apparent to those skilled in the art, but I prefer to apply a non-porous or impervious layer or coating of metal 27 to the basic sprayed metal layer. This second or facing layer 27, if of the latter type, will seal off the sprayed metal layer and thus make it continuous and fluid-resistant from the standpoint of a cooling fluid which may be applied thereto.

However, it may be advantageous to provide a metal facing sheet 28 and to apply it to the coating 27. The facing sheet or coating 28 is of particular value when the facing 27 is sprayed. However, the sheet 28 may also be advantageously employed when the facing sheet 27 is of non-porous metal. In such a case, the facing 27 will aid in fusing or securing the outer facing sheet 28 to the adherent sprayed coating.

I have been able to provide a composite metal coating which is securely attached, or in other words, is adherent to the brick or furnace block, and which is also fluid-resistant to cooling fluids such as are to be employed. It will be apparent that the sprayed coating that is adherent to the block may be termed an "intermediate" coating or layer to which a fluid-resistant layer is fused.

In Fig. 6, I show a metal facing sheet 30 that has horizontally-extending fins 31 which correspond to the fins 13, for example, and which is also provided with vertically-extending fins 32 that will enter into vertical joint lines between adjacent blocks 33, said vertical fins may extend almost or entirely to the glass, it being understood that the fins 31 will be inserted into the body of the blocks and can also overlie the horizontally-extending edges thereof.

Fig. 7 shows a metal face plate 34, which at joint lines between the blocks or at suitable intervals is provided with a rib or corrugation 35 that overlies a soft metal filling 36, which may extend into the block or be soldered to the outer edge of a metal fin 37. The portions 35 and 36 constitute an expansion joint which will permit of expansion and contraction of the parts under temperature changes, without cracks being formed in the facing and with less danger of the facing sheet pulling loose from the tank blocks. The soft metal filling 36 can be applied before the facing sheets 34 are put into place, or a soft metal can be melted and poured after the facing sheets are applied. In any case, it will have close engagement with the fin 37 and the facing sheet, to provide for heat conductivity between the fin 37 and the facing sheet.

Figs. 8, 9 and 10 show tank blocks having imbedded therein metallic inserts or pins 41, the pins extending endwise from a point adjacent to the inner face of the blocks to the outer face thereof. A facing sheet 42 of metal is applied to the outer face of the blocks 40 and the ends of the pins 41 are welded thereto. Between adjacent blocks 40 a vertical row of pins 43 are inserted, the blocks being grooved for receiving the pins. The pins 41 are arranged in horizontal rows, and the pins of each row are staggered relative to the pins of an adjacent row, so as to effect uniform cooling of the block throughout desired areas of the block. Also, in this case as with the fins 13, the inner ends of the pins will not erode rapidly when exposed to molten metal and such metal will merely freeze in any space between the pins and the blocks.

In Fig. 11, pins 44 are imbedded in the block and extend beyond the outer face thereof. A facing sheet 45 is applied to the block with the pins 44 protruding therethrough. The ends of the pins are bent into the plane of the sheet and are welded thereto, thereby facilitating installation of the facing sheet and also increasing the area of contact and thermal conductivity between the pins and the sheet.

In Fig. 12, pins 46 are provided with enlarged head portions 47 that are secured to a facing sheet 48, in order to secure greater thermal conductivity between the pins and the sheet.

If desired, the pins or inserts 41—44 may be of hollow form, open only at their outer ends and cooling fluid, such as air or water introduced therein. The pins 41—44 are preferably formed of metal having a high melting point, such as alloy steel.

I claim as my invention:—

1. A side wall for a melting tank, comprising a refractory block having a facing sheet of material having greater heat conductivity than the block and having a horizontally disposed fin extending into the block, the fin being provided with a vertically-extending flange at approximately the normal level of the molten metal.

2. A melting furnace composed of refractory blocks having metal facing sheets provided with fins extending into the joints between the blocks, the facing sheets at the joint lines of the blocks being offset to provide expansion joints.

3. A refractory body of clay or the like having metallic heat-conducting members extending inwardly from an exposed surface thereof, a sprayed metal coating on said surface having engagement with the outer ends of said surface, and a metallic facing sheet fused to the said coating.

4. A side wall for a melting tank comprising a refractory block, heat-conducting elements extending into said block and exposed at one side thereof, and a facing sheet connected to the outer ends of said elements, the said sheet having corrugations formed therein.

5. A side wall for a melting tank comprising a refractory block, metallic elements extending into said block from an exposed surface thereof, a facing sheet disposed against the outer face of the block and provided with corrugations opposite to said elements, and malleable metal filling the space between the corrugations and the outer ends of said element.

6. In a refractory block such as is employed in forming melting tanks for glass and other metals, a vertical portion adapted to extend from above the glass level in a tank downwardly, to substantially the full depth of the tank, a metal facing sheet mounted on the outer vertically extending surface of the block, said facing sheet having a flange extending beyond the top edge of the block horizontally inwardly, a plurality of metal elements extending from said facing sheet horizontally inwardly of the block, said elements having a spaced relationship with respect to each other and having a length greater than the length of said flange, said flange normally extending above the glass level in the tank and said elements normally extending below the glass level in the tank.

7. As a new article of manufacture, a refractory body of ceramic or vitreous material having a surface thereof provided with a fluid-resistant metal layer secured thereto by an intermediate coating of sprayed metal adhering to the refractory surface.

8. In a furnace construction, a refractory body of ceramic or vitreous material having a surface thereof provided with a fluid-resistant metal layer secured thereto by an intermediate coating of sprayed metal adhering to the refractory surface, and means for applying a cooling fluid to said metal layer.

9. As a new article of manufacture, a refractory body of ceramic or vitreous material having a surface thereof provided with a fluid-resistant continuous metal layer fused to an intermediate coating of sprayed-metal adhering to the refractory surface.

10. In a method of making an improved refractory body of ceramic or vitreous material, the steps of spraying molten metal on a surface of the refractory body to provide an adherent layer, and then fusing a metal facing layer to the sprayed metal layer to seal said surface against a fluid cooling agent.

11. As a new article of manufacture, a refractory body of ceramic or vitreous material having a surface thereof provided with a fluid-resistant metal layer secured thereto by an intermediate coating of metal adhering to the refractory body.

12. As a new article of manufacture, a refractory body of ceramic or vitreous material having a surface thereof provided with a fluid-resistant metal sheet secured thereto by a metal layer fused to a coating of sprayed metal adhering to the refractory surface.

13. In a method of making an improved refractory body of ceramic or vitreous material, the steps of spraying molten metal upon a surface of the refractory body to provide an adherent layer, and securing a metal facing layer to the sprayed metal layer to seal said surface against a fluid cooling agent.

ANDREW H. STEWART.